United States Patent Office 3,575,935
Patented Apr. 20, 1971

3,575,935
POLYAMIDE MOLDING PLASTICS
Edward U. Elam, Kingsport, Tenn., assignor to Eastman Kodak Company, Rochester, N.Y.
No Drawing. Filed Aug. 8, 1968, Ser. No. 751,039
Int. Cl. C08g 20/20
U.S. Cl. 260—78                                    4 Claims

ABSTRACT OF THE DISCLOSURE

Polyamides useful as molding plastics are derived from (A) at least one aromatic or alicyclic dicarboxylic acid and (B) 4,4-dimethyl-1,7-heptanediamine and/or 4-methyl-4-ethyl-1,7-heptanediamine.

---

This invention relates to polyamides useful as molding plastics. In one of its more specific aspects, this invention relates to such polyamides derived from alkyl-substituted heptanediamines.

Many polyamides are known in the art. For example, see U.S. Pats. 2,752,328; 3,145,193 and 3,198,771. These patents disclose the use of alkyl-substituted heptane-diamines in preparing polyamides.

I have discovovered that the properties of a polyamide which render it valuable as a molding plastic are unexpectedly improved when the polyamide is prepared using 4,4-dimethyl - 1,7 - heptanediamine and/or 4-methyl-4-ethyl-1,7-heptanediamine.

It is an object of this invention to provide linear polyamides useful as molding plastics. Another object of this invention is to provide polyamides having improved heat distortion temperatures, impact strength, and clarity. A further object of this invention is to provide polyamides derived from specific alkyl-substituted heptane-diamines. Other objects of this invention will appear herein.

These and other objects are attained through the practice of this invention, at least one embodiment of which comprises providing a linear polyamide having a heat distortion temperature of at least about 130° C. and derived from (A) at least one aromatic or alicyclic dicarboxylic acid and (B) at least one diamine having the general formula

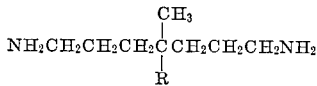

wherein R is methyl or ethyl, said polyamide having an inherent viscosity of at least about 1.0.

In order to be useful as a molding plastic, a polyamide should (1) be highly polymeric, that is, have an inherent viscosity (I.V.) of at least about 1.0, as measured at 25° C. using 0.23 gram of polymer per 100 ml. of a solvent consisting of 60 percent phenol and 40 percent tetrachloroethane, (2) have a heat distortion temperature of at least about 130° C., thereby permitting sterilization of the molded objects without distortion, (3) have a high impact strength, and (4) have a high degree of clarity. I have found that polyamides possess these properties when they are derived from at least one aromatic or alicyclic dicarboxylic acid and 4,4-dimethyl-1,7-heptanediamine and/or 4-methyl-4-ethyl - 1,7 - heptanediamine.

Examples of aromatic and alicyclic dicarboxylic acids which can be used to prepare the improved polyamides of this invention are terephthalic; isophthalic; 2,6-naphthalenedicarboxylic; 4,4'-diphenyldicarboxylic; and 1,4-cyclohexanedicarboxylic acids. It will be understood that use of the corresponding acid anhydrides, esters, and acid chlorides is included in the phrase "aromatic or alicyclic dicarboxylic acid." Preferred among these derivatives are the esters, examples of which are dimethyl isophthalate; dimethyl terephthalate; diphenyl terephthalate; dimethyl 1,4-cyclohexanedicarboxylate; and dimethyl 2,6-naphthalenedicarboxylate. Copolyamides may be prepared using two or more of the above-described acids. The acid which gives especially advantageous results is terephthalic acid.

Straight chain or aliphatic dicarboxylic acids (such as adipic, suberic and sebacic acids) or their alkyl-substituted homologs are not suitable for this invention because the resulting polyamides tend to have undesirably low heat distortion temperatures.

The diamines used in the practice of this invention are 4,4-dimethyl-1,7-heptanediamine and 4-methyl-4-ethyl-1,7-heptanediamine, both of which are represented by the general formula

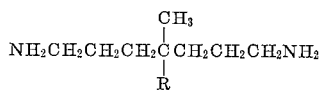

wherein R is methyl or ethyl. Copolyamides may be prepared using both of these diamines.

These polyamides may be prepared by well-known techniques and processes. For example, terephthaloyl chloride or diphenyl terephthalate may be condensed with the diamine by interfacial polymerization techniques.

Because of their improved properties, these polyamides are useful as molding plastics, such as in the preparation of gears, automobile accessories, tags and similar objects.

The improved properties discussed above are not attained when polyamides are prepared from diamines having the same total number of carbon atoms or having methyl and ethyl groups substituted at other than the 4,4-position. For example, the polyamide of 2,5-dimethyl-1,7-heptanediamine and terephthalic acid has a heat distortion temperature of only about 110° C., thereby rendering it unsuitable for use as a molding plastic.

The following examples are included for a better understanding of this invention.

EXAMPLE 1

A salt of 4,4-dimethyl-1,7-heptanediamine is prepared by the following procedure:

A mixture of 51 g. (0.307 mole) of terephthalic acid, 300 ml. of methyl alcohol, and 190 ml. of water is stirred, heated to reflux, and treated with 50.6 g. (0.322 mole) of 4,4-dimethyl-1,7-heptanediamine. The mixture is refluxed for 1 hour after addition is complete, and then 700 ml. of isopropyl alcohol is added at such a rate that reflux is maintained. The mixture is allowed to reflux for 30 minutes after addition of the isopropyl alcohol is complete. The mixture is then cooled to 10° C. and filtered. The filter cake is washed with cold isopropyl alcohol and dried. The yield of salt is 96 percent.

Five hundred grams of salt prepared as described above is placed together with 500 g. of water into a 2-l. stainless steel autoclave equipped with an agitator, means for adding and venting inert gas, and thermocouple wells. The wells are placed so that the wall and internal temperatures of the autoclave can be measured. The autoclave is then heated to 110–150° C. (wall temperature) for about 5 minutes while steam is allowed to escape from the vent in order to purge air from the system. The vent is then closed and the wall temperature raised to 310° C. When the internal pressure reaches 200 p.s.i., steam is allowed to escape at such a rate that the pressure does not exceed 300 p.s.i. Stirring, heating, and venting are continued until the internal temperature (the temperature of the reaction mixture) is 300° C., and the autoclave is at atmospheric pressure. The autoclave is then purged with a slow stream of nitrogen, and the temperature is maintained at 310° C. for 1 hour with slow agitation. The reactor is then cooled by a cold water bath, and the solid polymer is removed and ground up. The polymer has a glass transition temperature of 140° C. Small samples are molded in a 1 ounce Watson-Stillman press, and several larger lots are combined and molded in a Reed-Battenfeld press. Representative molding conditions and properties of the moldings are listed in the following table.

|  | Watson-Stillman |  | Reed-Battenfeld |
|---|---|---|---|
| Polymer I.V. | 1.14 | 1.39 | 1.12 |
| Molding conditions: |  |  |  |
| Pressure, pounds per square inch (p.s.i.) | 1,000 | 1,200 | 500 |
| Cylinder temperature, ° C | 290 | 290 | 290 |
| Mold temperature, ° C | 71 | 70 | 65 |
| Physical properties: |  |  |  |
| Hardness, Rockwell L | 106 |  | 108 |
| Hardness, Rockwell R | 123 |  | 125 |
| Tensile, yield strength, 10³ p.s.i. | 11.8 |  | 12.6 |
| Tensile, break strength, 10³ p.s.i. | 12.8 |  | 9.2 |
| Tensile, elongation, percent | 133 |  | 37 |
| Flexural modulus, 10⁵ p.s.i. | 3.8 |  | 3.6 |
| Notched Izod impact strength, 23° C., ft.-lb./in.: |  |  |  |
| V-notch | 1.3 | 2.2 | 1.4 |
| U-notch | 31.8 | 42.5 | 25.5 |
| Heat distortion temperature, 264 p.s.i., ° C | 143 |  | 133 |
| I.V. of molding | 1.13 | 1.32 | 1.06 |

A larger sample of the polymer is molded into ⅛ inch x 4⅛ inch x 4⅛ inch plaques on the Van Dorn 200-RS-6 reciprocating screw injection molding machine. The plaques are tested for impact strength by supporting them on a wooden block which has a 3 inch diameter void in the center and dropping a weight with a ½ inch spherical striking head onto the center of the plaque. At 73° F. the impact strength measured in this way is 42 ft.-lb.

Molded samples are immersed in various reagents for four weeks and the tensile properties compared with the original values. As tested in this way, the polymer shows excellent resistance to n-heptane; toluene; nitromethane; 1,4-dioxane; diethyl ether; methyl isobutyl ketone; ethyl acetate; methyl isobutyl carbinol; 2 percent sulfuric acid; and 10 percent sodium hydroxide.

The above-mentioned V-notch Izod impact strength tests are carried out according to well-known techniques, for example see American Society of Testing and Materials D 256. The U-notch tests are carried out in a similar fashion except that a square- or U-shaped notch is used wherein the opening measures 80 mils.

EXAMPLE 2

A salt is prepared from 4,4-dimethyl-1,7-heptane-diamine and trans-1,4-cyclohexanedicarboxylic acid, using the procedure of Example 1. This salt has a melting point 271–272° C. Polymerization of this salt by the procedure of Example 1 gives a tough, transparent polymer having properties which make it useful as an engineering molding plastic.

EXAMPLE 3

This example shows that a polymer prepared from a higher homolog of 4,4-dimethyl-1,7-heptanediamine has a much lower heat distortion temperature than the polymers of this invention. The heat distortion temperature of an engineering plastic should preferably be above at least 130° C. in order to permit sterilization of molded objects without distortion.

A salt of 5,5-dimethyl-1,9-nonanediamine (said diamine having a boiling point of 40° C. at 0.4 mm.) and terephthalic acid and the corresponding polymer are prepared by the procedure of Example 1. The heat distortion temperature of this polymer is 110° C., too low to permit molded objects prepared from this polymer to be sterilized without distortion.

EXAMPLE 4

A salt is prepared from 4,4-dimethyl-1,7-heptane-diamine and 2,6-naphthalenedicarboxylic acid. The melting point of this salt is 276–278° C. Polymerization of this salt by the procedure of Example 1 gives a tough resin useful as a molding plastic and having an inherent viscosity of 1.34. The heat distortion temperature (0.2 percent at 264 p.s.i.) is 133° C.

EXAMPLE 5

A salt is prepared from 4,4-dimethyl-1,7-heptane-diamine and isophthalic acid. Polymerization by the procedure of Example 1 gives a polymer having an I.V. of 1.61 and a heat distortion temperature of 130° C. This polymer is useful as a molding plastic.

EXAMPLE 6

A salt and 4-methyl-4-ethyl-1,7-heptanediamine and terephthalic acid and the corresponding polymer are prepared according to the procedure of Example 1. The polymer has good clarity, an I.V. of 1.7, and a heat distortion temperature of 139° C. Bars molded from this polymer have an Izod impact strength (ft.-lb. per inch) of 1.4 (V-notch) and 23.0 (U-notch). These properties render this polymer useful as a molding plastic.

The invention has been described in detail with particular reference to preferred embodiments thereof, but it will be understood that variations and modifications can be effected within the spirit and scope of the invention as described hereinabove and as defined in the appended claims.

I claim:

1. A linear homopolyamide having a heat-distortion temperature of at least about 130° C. consisting essentially of the polymeric condensation product of a carbocyclic aromatic dicarboxylic acid and a diamine having the general formula:

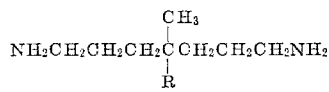

wherein R is methyl or ethyl, said polyamide having an inherent viscosity of at least 1.0, as measured at 25° C. using 0.23 gram of polymer per 100 ml. of a solvent consisting of 60 percent phenol and 40 percent tetrachloroethane.

2. A linear polyamide as defined by claim 1 wherein said carbocyclic aromatic dicarboxylic acid is terephthalic acid.

3. A linear polyamide as defined by claim 1 wherein said carbocyclic aromatic dicarboxylic acid is isophthalic acid.

4. A linear polyamide as defined by claim 1 wherein R is methyl.

References Cited

UNITED STATES PATENTS

| 2,752,328 | 6/1956 | Magat | 260—78 |
| 2,864,807 | 12/1958 | Nobis et al. | 260—78 |
| 2,937,162 | 5/1960 | Martin et al. | 260—78 |
| 2,965,616 | 12/1960 | Caldwell et al. | 260—78 |
| 3,145,193 | 8/1964 | Gabler | 260—78 |
| 3,150,117 | 9/1964 | Gabler | 260—78 |
| 3,198,771 | 8/1965 | Gabler | 260—78 |
| 3,294,758 | 12/1966 | Gabler | 260—78 |

HAROLD D. ANDERSON, Primary Examiner

U.S. Cl. X.R.

260—33.4